April 29, 1958     G. F. LEITNER ET AL     2,832,131
METHOD OF MANUFACTURING A COMPARTMENTED FLUID VESSEL
Filed Feb. 8, 1956     2 Sheets-Sheet 1
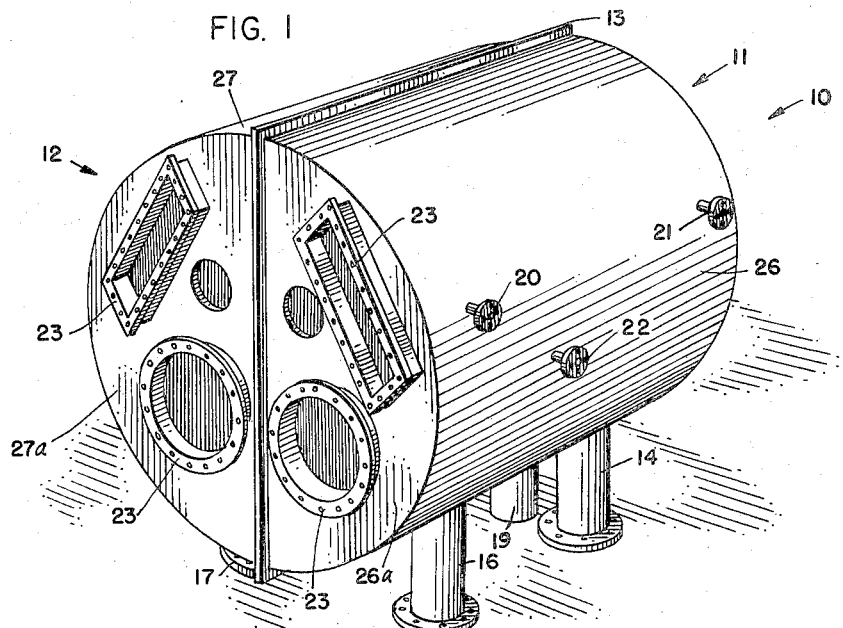
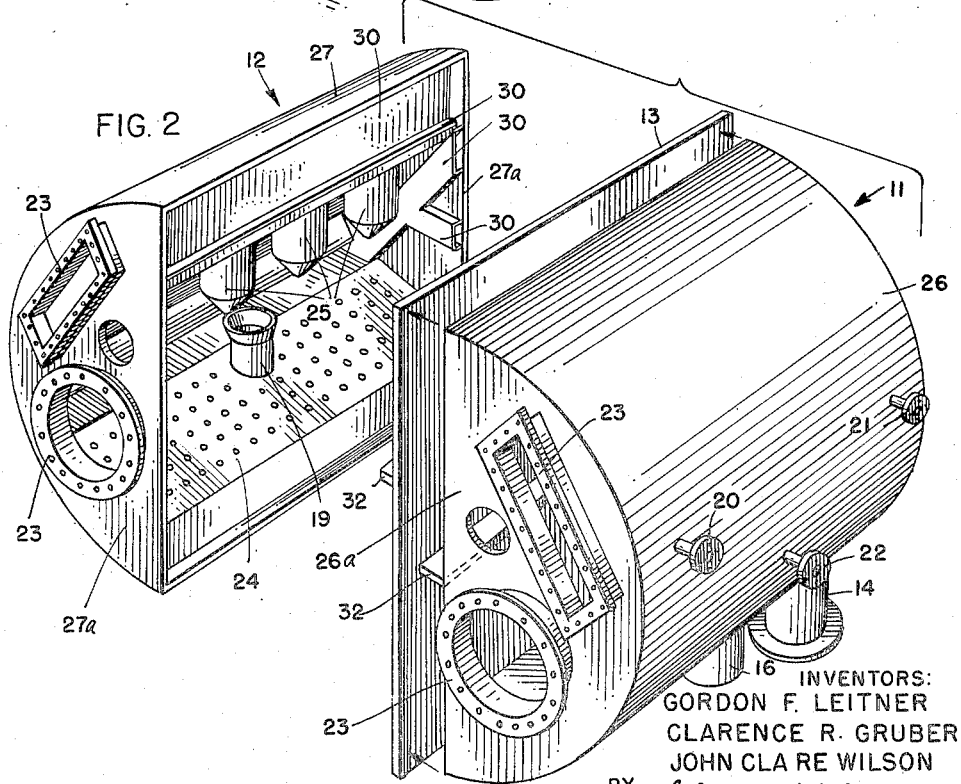
INVENTORS:
GORDON F. LEITNER
CLARENCE R. GRUBER
JOHN CLARE WILSON
BY Schroeder, Hofgren,
Bradly and Wegner, ATT'YS

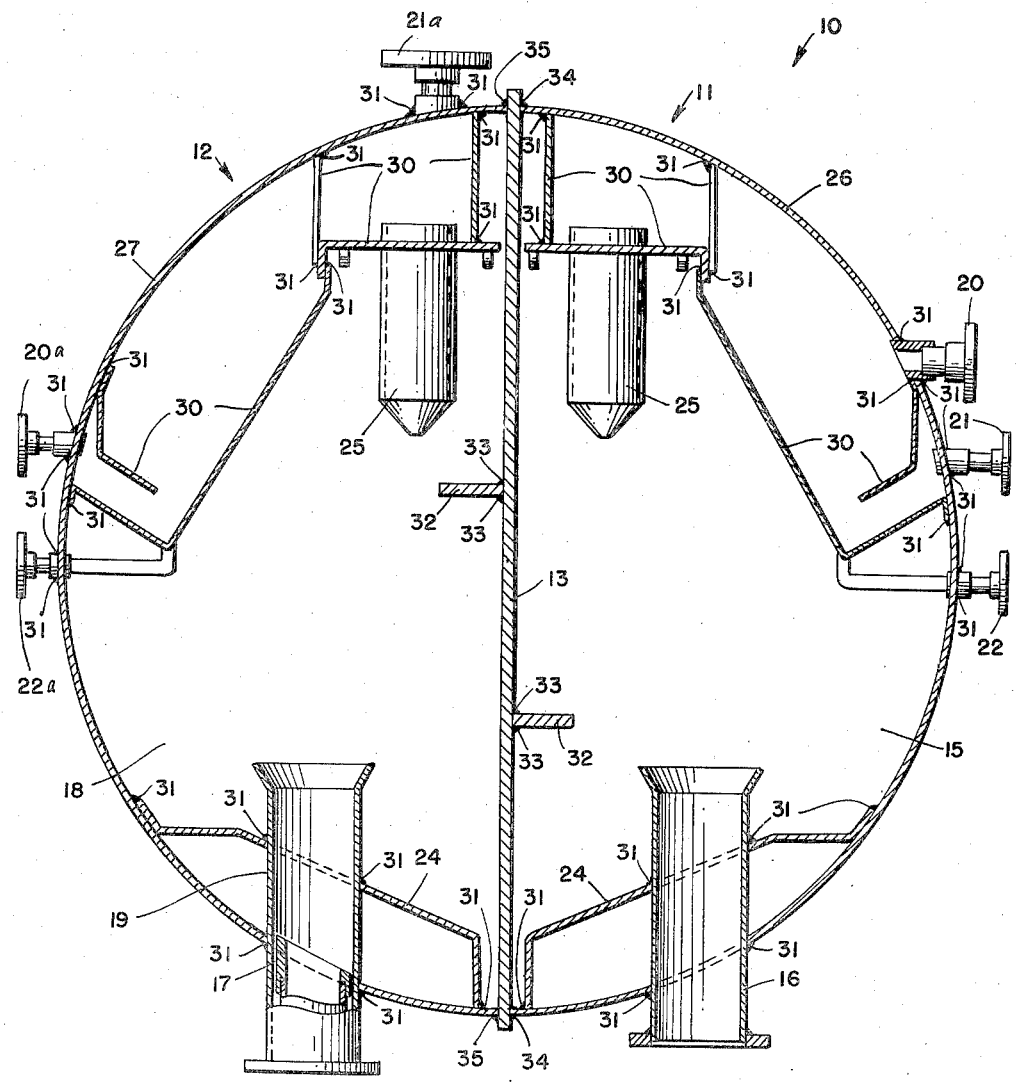

United States Patent Office 2,832,131
Patented Apr. 29, 1958

2,832,131

METHOD OF MANUFACTURING A COMPARTMENTED FLUID VESSEL

Gordon F. Leitner, Clarence R. Gruber, and John Clare Wilson, Milwaukee, Wis., assignors to Cleaver-Brooks Company, a corporation of Wisconsin Application February 8, 1956, Serial No. 564,258

6 Claims. (Cl. 29—469)

This invention relates to a method of manufacturing a generally cylindrical vessel and, more particularly, to a method of manufacturing a longitudinally compartmented cylindrical vacuum vessel for a two stage evaporation process.

When two or more chambers or compartments are required such as in a two stage evaporation process, there are a number of advantages to building both chambers in a single shell rather than building two separate shells. These advantages include savings in space, material, welding time, radiation loss and length of necessary interconnecting piping. It has, thus, become the general practice in the field to build one shell and partition the shell into two or more pressure-tight compartments.

The particular compartmented fluid vessel manufactured by the method disclosed herein, is especially well adapted to a two stage flash evaporation process for converting sea water into pure distilled water for use as drinking water, boiler makeup water and for other purposes. Such a process is especially valuable for use in ocean going vessels, submarines in particular, and for off-shore oil drilling rigs, especially as the main source of heat for this process is waste heat from the engines.

In this process, the sea water is heated by the waste heat of the engines to a temperature which is substantially below its boiling point and then pumped into a first vacuum chamber causing it to boil and give off vapor, the overflow from the first vacuum chamber passing through external piping to a second vacuum chamber in the same shell where further boiling occurs and additional vapor is given off. The vapor developed in each chamber passes through separators in each chamber where the excess moisture is removed therefrom and then passes as dry steam, into condensers where it is condensed into pure water and piped off into a distillate reservoir. The cool sea water passes through heat exchanger tubes in the condensers in both the chambers before being heated by the waste engine heat and, thus, acts as one of the heat transfer agents in the process, absorbing heat from the dry steam and causing it to be condensed into the pure water. These structures are built into a single cylindrical shell.

It is, therefore, believed obvious that in a compartmented vessel adapted for use in such a process, a large number of internal fittings such as baffles, overflow pipes, separators and supporting structures must be secured within each of the two chambers and that the partition plate must provide a very good pressure seal between the two chambers.

In the past it has been the general practice to build such a compartmented fluid vessel by forming a cylindrical shell and welding a partition plate inside the shell. Such a method of manufacture involves many difficulties such as the problem of getting a close fit-up between the partition plate and the shell along the whole length of the shell resulting, in many instances, in poor welding conditions. Another difficulty lies in the fact that all of the welding, both of the partition plate and of the previously mentioned internal fittings must be done inside the shell. This is a serious problem, especially in the smaller pressure vessels, from the standpoint of the welding personnel who must work in very small spaces with inadequate ventilation. Still another difficulty is that welding the partition plate and each fitting inside the shell can cause expansion and contraction with warping of the shell plates during the welding, making fitting up of subsequently placed fittings difficult.

It is, therefore, the general object of this invention to provide a method of manufacturing a compartmented vessel which obviates the difficulties heretofore encountered.

An object of this invention is to provide a new and improved method of manufacturing a generally cylindrical vessel for a two stage evaporation process and having two longitudinally extending chambers formed therein.

Another object of this invention is to provide such a method wherein welding personnel are provided with easy access for welding inside the vessel.

Another object of this invention is to provide such a method including the steps of forming a pair of half shells from metal plate, each in the shape of half of a closed cylinder divided longitudinally, welding the internal fittings within each half shell, forming a metal partition plate having dimensions somewhat larger than the open side of the half shells, and permanently joining the two half shells to the partition plate by welding.

A further object of this invention is to provide such a method wherein the step of welding the internal fittings in the half shells provides for better fit-up of such fittings and permits down-hand welding because of the greatly simplified manipulation and increased accessibility through the open side of the half shell.

A still further object of this invention is to provide such a method wherein the step of welding the half shells to the plate may be done externally by down-hand welding because the plate is of such a size that its edges project outwardly beyond the edges of the half shells, thus, resulting in a better fit-up and a better weld.

Other objects and advantages will become apparent from the following detailed description taken in connection with the accompanying drawings, in which:

Fig. 1 is a perspective view of a compartmented fluid vessel adapted for use in a two stage evaporation process and manufactured by a preferred method of this invention;

Fig. 2 is an exploded perspective view of the separate parts of the vessel of Fig. 1 showing some of the internal fittings welded therein; and Fig. 3 is a vertical sectional view taken through the vessel shown in Fig. 1.

While the invention herein described is a preferred embodiment, it is not intended to limit the invention to the specific form and arrangements shown, it being contemplated that various changes may be made by those skilled in the art without departing from the spirit and scope of the appended claims.

Referring now to the drawings for a description of a preferred embodiment of the invention, a cylindrical compartmented fluid vessel 10 manufactured by the method disclosed herein is shown in Fig. 1 and includes a first half shell 11 and a second half shell 12, both shells shaped like half of a closed cylinder divided longitudinally, welded to opposite sides of a partition or dividing plate 13. Also shown in Fig. 1 are a fluid inlet pipe 14 leading to a first fluid chamber 15 defined by the half shell 11 and the plate 13, a fluid overflow pipe 16 for the fluid chamber 15, a fluid inlet pipe 17 for a second fluid chamber 18 defined by the half shell 12 and the plate 13 and a fluid overflow pipe 19 for the fluid chamber 18. Fluid is delivered to the first fluid chamber 15 from a fluid heating means, the overflow pipe 16 being connected to the fluid inlet pipe 17 to conduct the overflow fluid from the first fluid chamber 15 to the second fluid chamber 18.

Connecting means 20 and 21 are secured in fittings in the half shell 11 and are adapted to be connected to provide for a flow of a heat transfer fluid through heat exchanger tubes disposed in the half shell 11, a connecting means 22 being secured in a fitting in the half shell 11 and adapted to be connected to remove distilled fluid from the half shell 11. Similar connecting means 20a, 21a and 22a are associated with the half shell 12, and are best shown in Fig. 3. Other fittings indicated collectively by the reference numeral 23 are shown secured to the ends of the fluid vessel 10.

An exploded view of the two half shells 11 and 12 and the partition plate 13, showing these members before they are permanently joined together to form the fluid vessel 10, is shown in Fig. 2, which also shows some of the baffles 24, separators 25 and other fittings indicated generally by the reference numeral 30 that are positioned and welded within each of the half shells 11 and 12 before the half shells 11 and 12 are permanently joined to the partition plate 13.

We shall now describe in more detail, with particular reference to Fig. 3, the steps preferred in the manufacture of the fluid vessel 10. Starting with metal plate, two sheets are cut or formed to the desired size. The necessary fluid and vapor inlet and outlet openings are then formed in these two sheets. The two sheets are then rolled into two substantially semi-cylindrically shaped members 26 and 27. Additional metal plate is then formed into semi-circular end or head members 26a and 27a of a size to fit over the ends of the semi-cylindrical members 26 and 27, after which the necessary openings for the fittings 23 are formed in the end members 26a and 27a. The members 26a and 27a are welded to the ends of the members 26 and 27, respectively, so as to form the two half shells 11 and 12, each in the shape of half of a closed cylinder divided longitudinally. Fttings 23 may be welded to the head plates before or after the heads are secured to the shell plates, as desired.

The two half shells 11 and 12 are then positioned for maximum accessibility through the open sides thereof to allow a welder to position and weld the baffles 24, separators 25, overflow pipes 16 and 19, and the additional fittings 30 within the half shell 11 and 12. As the half shells 11 and 12 may be positioned for most convenience to the welder, the welder may use down-hand welding for most of the welds deposited, such as the plurality of weld beads indicated at 31. Each half shell may be easily positioned and handled to permit fitting and welding of each of the internal fittings in the most expeditious manner. The large open side of the half shell provides the welder with maximum accessibility.

The partition plate 13 is then formed from metal plate of such a size so as to have a length and width somewhat greater than the length and width of the open sides of the half shells 11 and 12. Thus, when the half shells 11 and 12 and the plate 13 are positioned together, the edges of the plate 13 project outwardly from the edges of the half shells 11 and 12. To provide increased stability of the partition plate 13, a series of stiffening members 32 may be secured by welding to the plate 13, as shown at 33. These stiffening members 32 are welded to the plate 13 so as to extend laterally therefrom and are arranged lengthwise of the plate 13 spaced apart alternately on opposite sides of the plate 13.

After the required internal fittings have been secured in the half shells 11 and 12 and the stiffening members 32 have been secured to the partition plate 13, these parts are ready to be permanently joined together to form the fluid vessel 10 having the pair of longitudinally extending fluid chambers 15 and 18 sealed from each other by the plate 13.

There are many specific procedures that could be followed in permanently joining together the half shells 11 and 12 in the partition plate 13. One such procedure will be described herein. The partition plate 13 is first supported in a generally horizontal position, and one of the half shells 11 is positioned thereon with its open side against one side of the plate 13, the half shell 11 being substantially centered on the plate 13 so that the edges of the plate 13 project outwardly from the edges of the half shell 11 approximately the same distance at each edge. Then an external weld bead 34 is deposited by down-hand welding along the intersection of the half shell 11 and the plate 13, thus, permanently securing the half shell 11 to the plate 13.

The joined plate 13 and half shell 11 are then turned over and the other half shell 12 is positioned on the other side of the plate 13 with its open side against the plate 13, the half shell 12 being substantially centered on the plate 13. An external weld bead 35 is then deposited by down-hand welding along the intersection of the half shell 12 and the plate 13 to permanently secure the half shell 12 to the plate 13. It should be noted that both the welds 34 and 35 are external welds which may be deposited by the welding personnel with minimum effort.

We have, thus, herein disclosed an improved method of manufacturing a generally cylindrical vessel 10 having a pair of longitudinally extending fluid chambers 15 and 18 formed therein and sealed from each other which obviates the disadvantages of the methods of manufacture presently used in this field. The difficulties of fitting a partition plate into a cylindrical shell are also avoided since some misalignment of the two half shells is accommodated by the partition plate without affecting either the welding or the fluid tightness of the resultant vessel compartments.

While the particular method of construction disclosed herein is particularly advantageous for manufacturing a vacuum shell for a two stage evaporation process which of necessity requires a group of internal fittings, the method is also advantageous in the manufacture of any pressure or vacuum vessel requiring more than one internal compartment. Providing a method of construction wherein the shell plates are externally welded to outwardly projecting edges of partition plates disposed substantially within the vessel results in substantial savings, particularly because the heat of welding does not materially affect the condition and space of fitting near the weld joint. Some expansion and contraction of the plates due to the heat of welding can occur without causing undue gaps between the shell and partition plate at the joint to be welded, as often occurrs when such a plate is fitted within a shell and welded internally thereto, resulting in welding delay or the necessity of providing mechanical means to force the parts together. The advantages of the present invention do not depend upon the particular shape of the half shell sections as will be readily apparent. Thus, the term cylinder is used in the sense of a surface generated by a straight line moving parallel to a fixed straight line and not necessarily in a circular path.

We claim:

1. The method of manufacturing an evaporator for a two stage evaporation process, comprising the steps of forming a pair of half shells, each substantially in the form of one-half of a closed cylinder divided longitudinally, placing and welding internal fittings into the half shells through the open side of each, then covering the open side of each half-shell with a dividing plate positioned between the two half shells, said plate being of a size so as to extend beyond the edges of the half shells, and externally welding the edges of the half shells to the outwardly extending portions of said plate to complete a cylindrical vessel having a pair of fluid and pressure tight internal chambers.

2. The method of manufacturing a cylindrical vessel having at least a pair of internal chambers each equipped with internal fittings, comprising the steps of forming metal plate into cylindrical curvature and joining semi-circular head plates to the ends thereof to form a pair of half-shell sections each comprising generally one-half of a closed cylinder divided axially, positioning the half shell sections with the open face thereof in accessible position while placing internal fittings through the open side of each half shell and welding the fittings in place, then closing the open side of each half shell with a common dividing plate having dimensions greater than the open side of either half shell, and welding each shell section to the plate with an external bead to complete the vessel with separate internal pressure tight compartments.

3. The method of manufacturing a generally cylindrical vessel for a two stage evaporator having a pair of longitudinally extending fluid chambers formed therein which are fluid sealed from each other, comprising the steps of forming metal plate into a pair of generally semi-cylindrical members, welding semi-circular plates to the ends of said members to form a pair of half shells, positioning the half shells for maximum accessibility through the open sides thereof, positioning and welding a plurality of internal fittings into each of said half shells through the open sides thereof, assembling the half shells against a partition plate positioned between the open sides of the half shells, said plate being of a size so that the edges project outwardly from the edges of the half shells, and then welding the edges of the half shells to said plate with an external bead.

4. The method of manufacturing a generally cylindrical vessel for a two stage evaporator having a pair of longitudinally extending fluid chambers therein which are sealed from each other, comprising the steps of rolling two metal plates into generally semi-cylindrical members, welding semi-circular end plates to the ends of each of said members to form two half shells, welding a plurality of baffles, separators and fittings within each of said shells through the open sides thereof while positioning the shell to provide for down-hand welding of a major portion of the welds deposited, positioning a partition plate larger in configuration than the open side of the half shells substantially horizontal and then arranging one of said shells on said plate with the open side disposed thereagainst, welding said shell to said plate with an external bead formed by down-hand welding, turning said welded shell and plate over so that said shell extends below said plate, then positioning the other of said shells on said plate with the open side disposed thereagainst, and welding said other shell to said plate with an external bead formed by down-hand welding.

5. The method of manufacturing a cylindrical compartmented fluid vessel for a two stage evaporator, comprising the steps of providing a pair of substantially equal sized metal plates, forming in said plates a plurality of openings adapted to receive fittings, rolling each of said plates into a semi-cylindrical member, securing semi-circular metal end plates to the ends of said members to form a pair of half shells in the shape of half of a closed cylinder divided longitudinally, positioning each half shell for maximum accessibility through the open side thereof while locating and welding a plurality of baffles, separators and supporting fittings therein, providing a sheet of metal adapted to provide a sealed partition between the half shells and having a length and width somewhat greater than the length and width of the open side of said half shells, welding a plurality of laterally extending stiffening members on said plate, said stiffening members extending substantially the length of said plate and being spaced apart alternately on opposite sides of said plate, and then permanently joining the half shells and said plate together by an external weld bead so as to form a cylindrical vessel having two longitudinal fluid chambers tightly sealed from each other by said plate.

6. The method of manufacturing a generally cylindrical vessel for a two stage evaporator, comprising the steps of forming a pair of half shells each in the form of half of a closed cylinder divided longitudinally, positioning and welding within each of said half shells a plurality of baffles, separators and supporting fittings while the half shells are positioned for convenient access by a workman through the open sides of the half shells, forming a partition plate large enough to fit over the open sides of said half shells with the edges extending outwardly beyond the edges of said half shells, positioning the open sides of each of said half shells against opposite sides of said partition plate, and welding the edges of said half shells to the edges of said plate with an external bead so as to form a generally cylindrical vessel having a pair of longitudinally extending pressure tight fluid chambers formed therein.

References Cited in the file of this patent

UNITED STATES PATENTS

| | | |
|---|---|---|
| 195,954 | Rowland | Oct. 9, 1877 |
| 1,858,512 | Langenberg et al. | May 17, 1932 |
| 2,671,957 | Sheffer et al. | Mar. 16, 1954 |